United States Patent
Hou et al.

(10) Patent No.: US 12,412,370 B2
(45) Date of Patent: Sep. 9, 2025

(54) METHOD AND SYSTEM OF IMAGE HASHING OBJECT DETECTION FOR IMAGE PROCESSING

(71) Applicant: Intel Corporation, Santa Clara, CA (US)

(72) Inventors: Yuqing Hou, Beijing (CN); Xiaolong Liu, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 304 days.

(21) Appl. No.: 18/030,024

(22) PCT Filed: Nov. 13, 2020

(86) PCT No.: PCT/CN2020/128632
§ 371 (c)(1),
(2) Date: Apr. 3, 2023

(87) PCT Pub. No.: WO2022/099600
PCT Pub. Date: May 19, 2022

(65) Prior Publication Data
US 2023/0368493 A1     Nov. 16, 2023

(51) Int. Cl.
*G06V 10/764* (2022.01)
*G06V 10/776* (2022.01)
*G06V 10/82* (2022.01)

(52) U.S. Cl.
CPC .......... *G06V 10/764* (2022.01); *G06V 10/776* (2022.01); *G06V 10/82* (2022.01)

(58) Field of Classification Search
CPC combination set(s) only.
See application file for complete search history.

(56) References Cited

U.S. PATENT DOCUMENTS 11,475,310 B1 *  10/2022  Teig ................ G06N 3/084
12,045,992 B2 *   7/2024  Tsai ................ G06F 18/2415
(Continued)

FOREIGN PATENT DOCUMENTS

CN     111291841 B     8/2020
CN     111738301 A    10/2020

OTHER PUBLICATIONS

International Preliminary Report on Patentability from PCT/CN2020/128632 notified May 25, 2023, 6 pgs.
(Continued)

*Primary Examiner* — Bobbak Safaipour
(74) *Attorney, Agent, or Firm* — Hanley, Flight & Zimmerman, LLC

(57) ABSTRACT

A method and system of image hashing object detection for image processing are provided. The method comprises the following steps: obtaining image head class input data and image tail class input data differentiated from the head class input data and respectively of two images each of an object to be classified; respectively inputting the head and tail class input data into two separate parallel representation neural networks being trained to respectively generate head and tail features, wherein the representation neural networks share at least some representation weights used to form the head and tail features; inputting the head and tail features into at least one classifier neural network to generate class-related data; generating a class-balanced loss of at least one of the classes of the class-related data comprising factoring an effective number of samples of individual classes; and rebalancing an output sample distribution among the classes at the representation neural networks, classifier neural networks, or both by using the class-balanced loss.

20 Claims, 11 Drawing Sheets

(56) References Cited

U.S. PATENT DOCUMENTS

| | | | | |
|---|---|---|---|---|
| 2016/0132786 | A1* | 5/2016 | Balan | G06N 20/00 |
| | | | | 706/12 |
| 2018/0165554 | A1* | 6/2018 | Zhang | G06N 3/045 |
| 2021/0334644 | A1* | 10/2021 | Yu | G06N 3/045 |
| 2022/0114807 | A1* | 4/2022 | Iancu | G06V 20/58 |
| 2022/0156530 | A1* | 5/2022 | Tiong | G06V 10/454 |
| 2023/0419648 | A1* | 12/2023 | Ghafoorian | G06V 10/82 |
| 2024/0296661 | A1* | 9/2024 | Spitzer | G06V 10/774 |
| 2025/0139111 | A1* | 5/2025 | Krishna | G06F 16/248 |

OTHER PUBLICATIONS

Cui, Y. et al., "Class-Balanced Loss Based on Effective Number of Samples", arXiv:1901.05555v1, Jan. 16, 2019.

He, K. et al., "Deep Residual Learning for Image Recognition", arXiv:1512.03385v1, Dec. 10, 2015.

Huang, C. et al., "Learning Deep Representation for Imbalanced Classification", CVPR, 2016.

International Search Report and Written Opinion for PCT Patent Application No. PCT/CN2020/128632, dated Aug. 19, 2021.

Janson, S., "Random coverings in several dimensions", Acta Math. 156: 83-118 (1986).

Liu, J. et al., "Deep Representation Learning on Long-tailed Data: A Learnable Embedding Augmentation Perspective", arXiv:2002.10826v3, Apr. 12, 2020.

Liu, Z. et al., "Large-Scale Long-Tailed Recognition in an Open World", arXiv:1904.05160v2, Apr. 16, 2019.

Reed, W., "The Pareto, Zipf and other power laws", Economic Letters, 2001.

Shen, L. et al., "Relay Backpropagation for Effective Learning of Deep Convolutional Neural Networks", arXiv:1512.05830v2, Apr. 3, 2016.

Yong, Y. "Hashing-Image Retrieval", http://yongyuan.name/blog/codes-of-hash-for-image-retrieval.html, Mar. 25, 2014.

Zhou, B. et al., "BBN: Bilateral-Branch Network with Cumulative Learning for Long-Tailed Visual Recognition", arXiv:1912.02413v4, Mar. 10, 2020.

* cited by examiner

METHOD AND SYSTEM OF IMAGE HASHING OBJECT DETECTION FOR IMAGE PROCESSING

CLAIM OF PRIORITY

This Application is a National Stage Entry of, and claims priority to, PCT Application No. PCT/CN2020/128632, filed on 13 Nov. 2020 and titled "METHOD AND SYSTEM OF IMAGE HASHING OBJECT DETECTION FOR IMAGE PROCESSING", which is incorporated by reference in its entirety for all purposes.

BACKGROUND

Many computer and electronic devices perform object detection on images captured by one or more cameras in order to identify objects in an image for security surveillance, access authorization, tracking and/or analyzing people or objects such as athletes, traffic, and so forth, entertainment, enhancing the images whether for artistic, medical, or scientific, or other purposes, and so on. This may include semantic object detection that ultimately provides scene understanding of the images for computer vision (CV) and/or artificial intelligence (AI) for example. One conventional technique is to use image hashing where each identifiable class of an object in an image or part of an image is provided a hash so that when multiple devices or systems use the same hash technique, the system merely needs to search for the hash rather than a relatively larger load of image data to find matching images with the same or similar objects.

The object detection for the image hashing is often performed by using deep neural networks (DNNs). These networks, however, still have significant inaccuracies due to inadequate training. The neural networks typically are trained on a pre-determined set of real world classes visible in the real world, and therefore visible to cameras capturing images of the real world. The extremely large variation (or distribution) of frequency of the objects, and in turn classes, in the real world often cause skewed neural networks that favor the more common classes or over-compensate the rarer classes when compensation algorithms or compensation network structure is applied.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
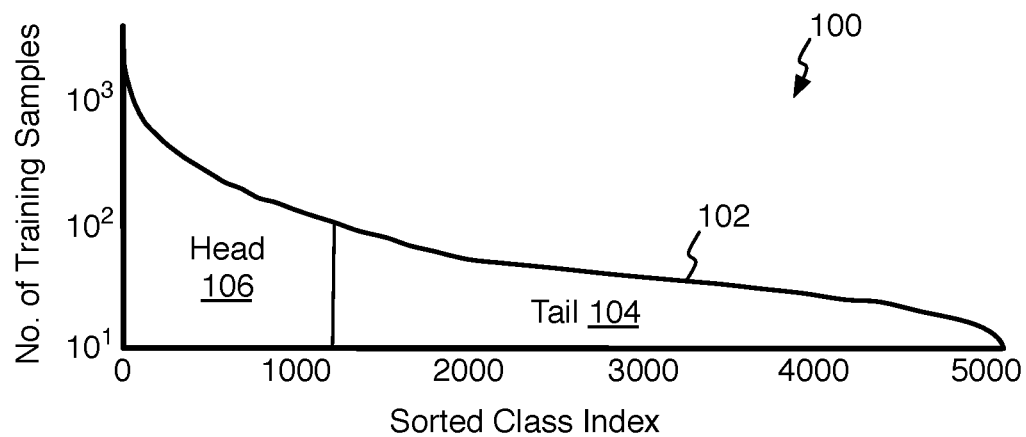
FIG. 1 is a graph showing long-tail classification data used to train an object detection neural network according to at least one of the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices such as servers and/or consumer electronic (CE) devices such as imaging devices, digital cameras, smart phones, webcams, video game panels or consoles, set top boxes, tablets, and so forth, any of which may have light projectors and/or sensors for performing object detection and other tasks, and may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of image hashing object detection for image processing are described herein.

It has been found that object detection and recognition performed by analyzing images with the use of neural networks can be relatively accurate. Convolutional neural networks (CNNs) can be trained for such tasks by using large-scale, real-world annotated datasets that attempts to include image data of most visible views that can be found and recorded all over the world. A number of these real-world datasets are known and available for use such as ImageNet100, Cifar100, and ObjectNet to name a few examples.

Referring to FIG. 1, difficulties arise because real-world image datasets are inherently long-tailed and open-ended. Specifically, when real world images are captured, the frequency distribution 102 of visual categories (or classes) of visible objects around the world, and in turn in the images captured by cameras, is long-tailed which refers to a long tail 104 on a histogram or graph 100 of sample frequency distribution 102. The head 106 on the graph 100 has a few common classes with a very large number of occurrences for each class while many more rare ("few shot") classes form the tail 104 of the graph 100 where each class has much fewer occurrences relative to the head. Also, the term opened ended refers to images that include visual objects or perspectives that have not been encountered before by a neural network dataset and were not originally included on a training set for the neural network.

CNNs trained on such real-world datasets perform relatively poorly for weakly represented classes in the tail because the strong or heavy representation of the head classes causes the neural network results to favor the head classes. Artificial or non-real-world datasets, or mixes of both non-real-world and real-world image data, attempt to avoid this problem by providing a more uniform number of samples for all classes, but usually cannot achieve the accuracy of the real-world datasets precisely because their distribution is not as long-tailed a distribution as real world scenarios.

In a number of conventional training techniques of object detection neural networks, a first part of the network performs representation learning that generates accurate representations in the form of features of the image data, and a second part of the network performs classifier learning which outputs predicted classes. Comparing the predicted class to the actual class is a loss that can be used to update weights to be used on a next iteration of the network. Thus, one conventional solution for handling long-tailed problems is class re-balancing which attempts to compensate for the extreme imbalance of the training data. Class re-balancing directly influences the classifier weights' updating of deep networks to increase the accuracy of the classifier learning. However, rebalancing methods also are known to unexpectedly damage the representative ability of the learned deep features during the representation learning to some extent.

In more detail, class re-balancing methods are roughly categorized into two groups: resampling and re-weighting. In resampling, the classes are better balanced by undersampling the head classes of the real-world dataset and oversampling the tail classes of the real-world dataset. One example of re-sampling has a training system that enforces both inter-cluster and inter-class margins with the classes to learn a more discriminative deep representation network. This tighter constraint effectively reduces the class imbalance inherent in the local data neighborhood. See Huang, C., et al., "Learning deep representation for imbalanced classification", CVPR (2016). Resampling, however, can often over-fit the tail data (by oversampling), and/or under-fit the whole data distribution (by under-sampling) when the data imbalance is extreme.

With regard to re-weighting, cost-sensitive re-weighting reduces loss values of the head classes and increases loss values of the tail classes. In one example, the issue is considered from an information theoretical perspective, and uses relay backpropagation to encourage propagation of effective information through the network in the training stage. Relevant information can be effectively preserved, and the adverse effect of less relevant information can be restrained. See Shen, L, et al., "Relay backpropagation for effective learning of deep convolutional neural networks", ECCV (2016). The result can be a neural network that tests closer to the sample distribution or frequency of the real-world-input training data. The re-weighting alone, however, has been found to distort the original distributions by directly changing or even inverting the input data frequency distribution of the classes. This results in erroneous weights for the trained network and therefore inaccurate object detection.

In yet another example referred to as a cumulative learning method, a unified bilateral-branch network (BBN) handles both representation learning and classifier learning simultaneously in parallel branches. The representation learning branch receives head and tail input data in a forward order, and the classification learning branch receives the head and tail data in the reverse order. This technique then uses a cumulative learning stage to perform re-weighting between feature outputs of the two branches. This system first learns universal (head class) patterns and then gives more and more attention to the tail data gradually as time passes. For this pure cumulative learning method, however, the emphasis is on the separation of representation learning and classifier learning, but does little to rebalance head classes, tail classes, and open classes. Thus, this cumulative learning technique usually performs poorly for weakly represented classes in the tail. See Zhou, B, et al., "BBN: Bilateral-Branch Network with Cumulative Learning for Long-Tailed Visual Recognition. CVPR (2020).

To resolve these issues, the disclosed system and method uses a deep learning network for few-shot, long-tailed and open class image hashing. The method combines both the benefits of a representation learning stage and a subsequent classifier learning stage with rebalancing to form a unified framework. Specifically, the present method uses a classifier learning stage that has a cumulative learning stage separating the representation learning stage from the rebalancing at the classifier learning stage. The classifier learning stage also may perform class-balanced loss generation that results in re-weighting or re-balancing of the loss, and in turn, rebalancing the sample distribution over the available head and tail classes when the networks are updated on a subsequent iteration. The rebalancing (or class-balancing) may be performed by using a loss function that factors an effective number of samples for a class by factoring overlapping (or duplicate) image data. The loss function, therefore, can be considered a way to estimate the validity of the samples. This is in contrast to conventional heuristic methods where a class-balanced loss simply is used to assign sample weights inversely proportional to the class frequency. With this arrangement, the present training neural network and operation thereof achieves great performance gains versus conventional methods on real-world cifar100 and imagenet100 datasets.

Figure 2A:
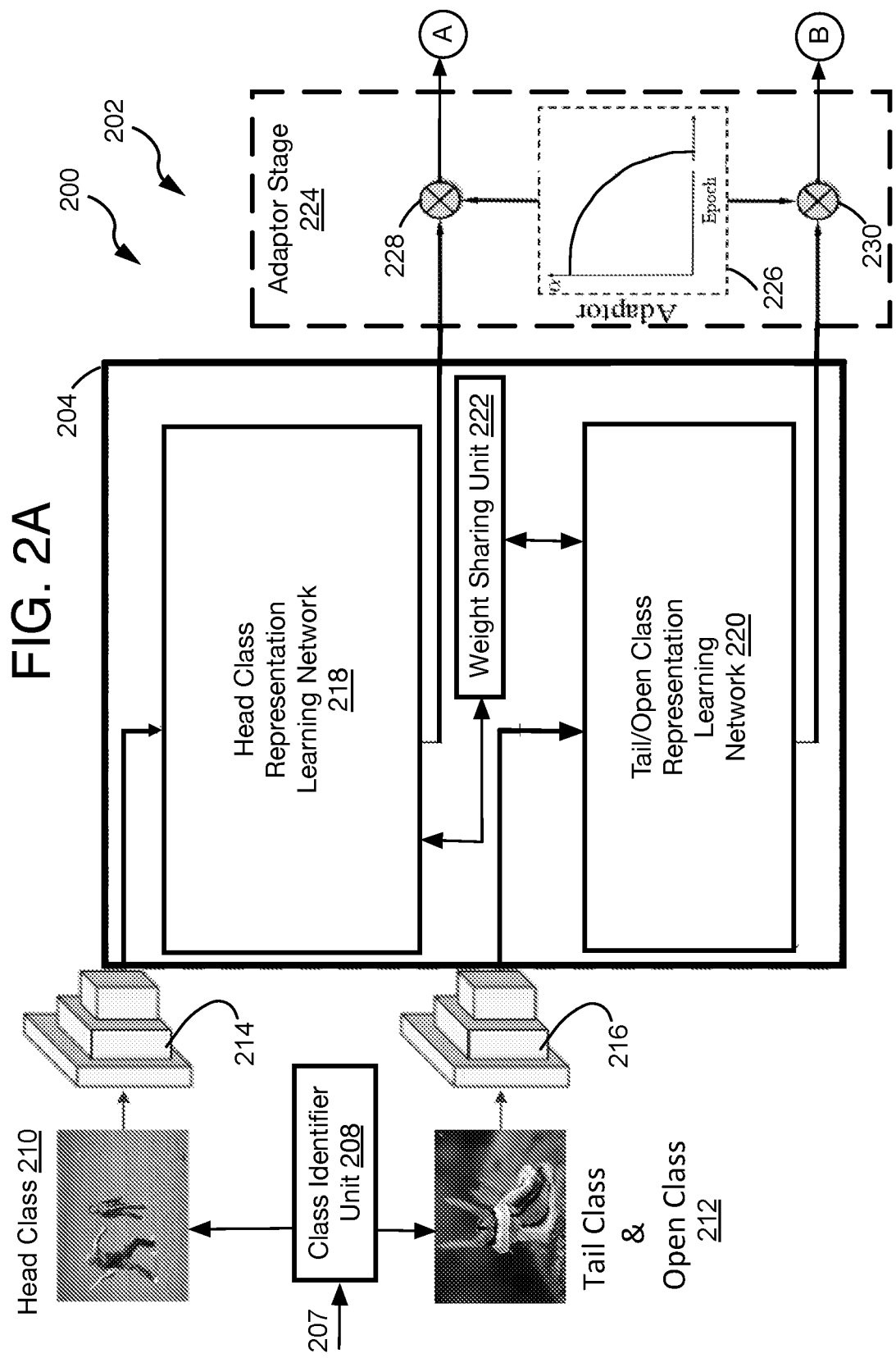
FIGS. 2A-2B is a schematic diagram of a training network according to at least one of the implementations herein.
Figure 2B:
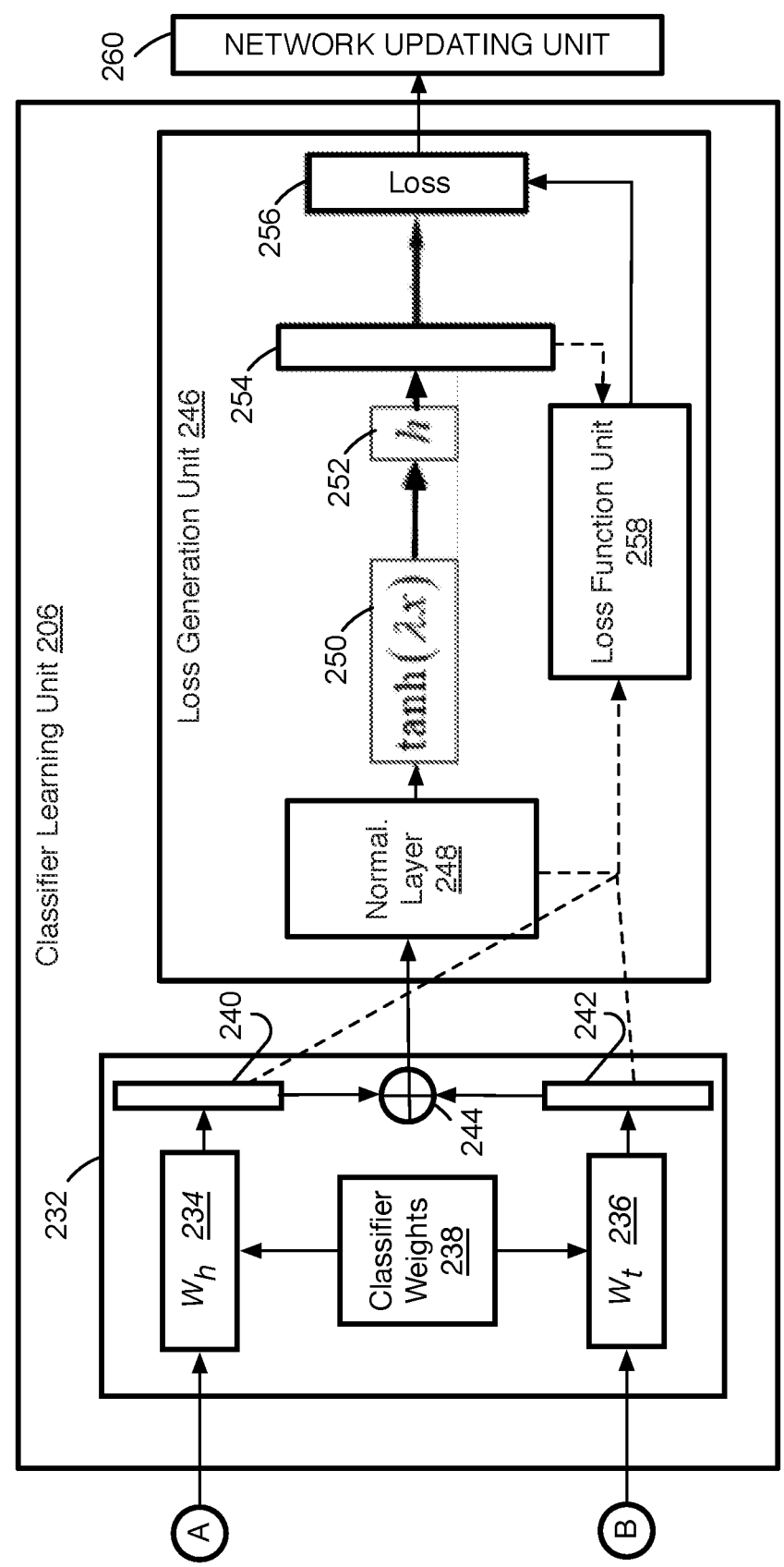

Referring to FIGS. 2A-2B, an image processing system 200 has an image hashing object detection neural network 202 to perform the network training methods such as process 400 and 500 described herein. The network 202 includes a representation neural network learning unit 204 and a classifier learning unit 206 that performs re-weighting or rebalancing of an output sample distribution (or frequency) over a set of available classes. By one form, the network 200 has at least one convolutional layer.

Specifically, a known real-world dataset of images or samples 207, such as Cifar100 or ImageNet100 for example, may be input to a class identifier unit 208 that determines whether a sample shows an object that is a head class or a tail class. Image head class input data of an image 210 with a head class object and image tail class input data of an image 212 with a tail class object (or an image with an unknown open class not from the dataset) are respectively provided to a head and tail class object detection (or feature extraction) networks 214 and 216. These feature extraction networks 214 and 216 may have the same layer structure, and by one form, with the use of residual blocks described below.

The networks 214 and 216 provide initial or direct image features (or feature vectors) respectively to two head and tail/open representation (learning) networks (or just representation networks) 218 and 220 that represent an image of an object for classifiers. The representation networks 218 and 220 provide refined features with better accuracy than a typical object detection network, such as networks 214 and 216, to better represent their respective images or samples in a format that can be used by classifier networks 234 and 236. The tail representation network 220 also may be trained to handle open classes not annotated in the input dataset but that are added as unknown classes.

Figure 3:
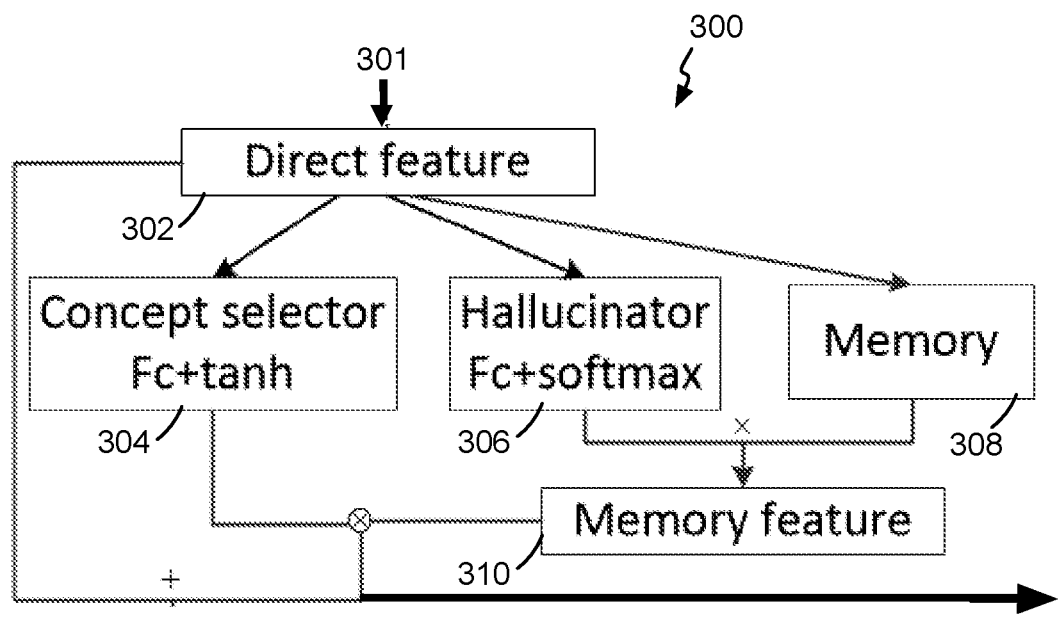
FIG. 3 is a schematic diagram of an example representation learning stage of the neural network of FIG. 2.

Referring to FIG. 3, many different types of networks can be used as the representation neural networks 218 and 220. By one example, the head and tail representation networks 218 and 220 may be twin or Siamese networks that have the same layer structures and may have a weight sharing unit 222 that provides the same weights to both networks. By one form, an example representation neural network 300 is shown and can be used as both the head and tail representation networks 218 and 220 in a bi-branch network arrangement. Network 300 may be an open long tailed recognition network that uses a visual memory feature 310 to adaptively provide knowledge to both head and tail classes to increase the accuracy of the classifications. Direct features 302 from object detection networks 214 and 216, for example, are used by a concept selector 304 that controls the memory features, a hallucinator 306 that provides coefficients to the memory feature, and a memory module 308 that holds visual concepts of training classes. Operation of the network 300 and other details are provided below.

By one alternative, the head and tail features (or more accurately feature vectors) that are output from the representation networks 218 and 220 may be compared to a threshold to determine if the feature has sufficient accuracy to be provided to the classifiers.

By another alternative, an adapter stage 224 provides an adapter factor to compensate for head-biased influence by providing more strength to tail features versus the head features. This is accomplished by applying an adaptor factor $\alpha$ to the head and tail features in an inversely correlated manner to increase the values of the tail feature while reducing the values of the head features as epoch (or iterations) of the representation networks 218 and 220 are being run. The compensating variation of the adapter factor is represented by graph 226. The modified head and tail features are then provided for classification.

Next, a classifier or classification learning unit 206 may have a cumulative learning unit 232 and a loss generation unit 246. The cumulative learning unit 232 may perform the classification of the head and tail features (whether modified or not) and may cumulate the output classification probabilities of the two features. The result is a single class probability vector. The loss generation unit 246 may normalize the class probability vector, optionally provide a hash value for the class probability vector, and provide a class-balanced loss (CBL) that can be used to update network weights to re-weight or re-balance the sample distribution at the representation and classifier neural networks. Thus, it will be understood that the classifier learning unit is described as re-balancing or re-weighting because it provides the CBL that can be used subsequently to adjust the weights to be used in a next or subsequent epoch of the representation and/or classifier networks.

To accomplish these tasks, the cumulative learning unit 232 may have head and tail classifiers $W_h$ 234 and $W_t$ 236. Alternatively, the classifiers 234 and 236 may be considered separate and previous to the cumulative learning unit 232. A classifier weights unit 238 provides the weight for classifier networks used by the classifiers 234 and 236. The output head and tail class probability vectors 240 and 242 respectively output by the classifiers 234 and 236 are then cumulated by an adder or other function 244 to create a single cumulated class probability vector. The single class probability vector (or just probability vector) then may be normalized by a normalization layer unit 248. A hash is then generated to imitate a run-time network and to ensure adequate hashes are being formed. Thus, a pre-hash unit 250, here using a $\tanh(\lambda x)$ function but could be another function, is used to prepare the probability elements of the probability vector to generate a hash code, and by one form, to map the vector to a size compatible with the desired size of the hash code. Hash unit 252 generates the hash, and a post-hash unit 254 de-maps the vector to its previous size as would be done on a run-time network.

A loss function unit 258 also may receive the highest head and tail probability class of the head and tail class probability vectors 240 and 242, the cumulated class probability vector, whether or not normalized, or the re-sized version from the post-hash unit 254. The loss function unit 258 may generate the CBL by determining a direct loss between the predicted classes and ground truths of both the image head class input data and image tail class input data. The direct loss is then modified by a factor relating to an effective amount of the samples per class. The two modified head and tail losses are then combined or summed in order to generate the single CBL that provides additional accurate compensation for the head bias.

Once the re-weighting or rebalancing loss as a CBL or a more generic weighted sum loss (WSL) are determined, a network updating unit 260 may use the loss as a cost value, or use the loss to form a cost value, in network updating algorithms, such as a backpropagation (BP) algorithm, that updates at least the network parameter weight values at the representation weight sharing unit 222 and/or classifier weights unit 238. The description of processes 400 and 500 below explain details of the operation of the components of network 202.

Figure 4:
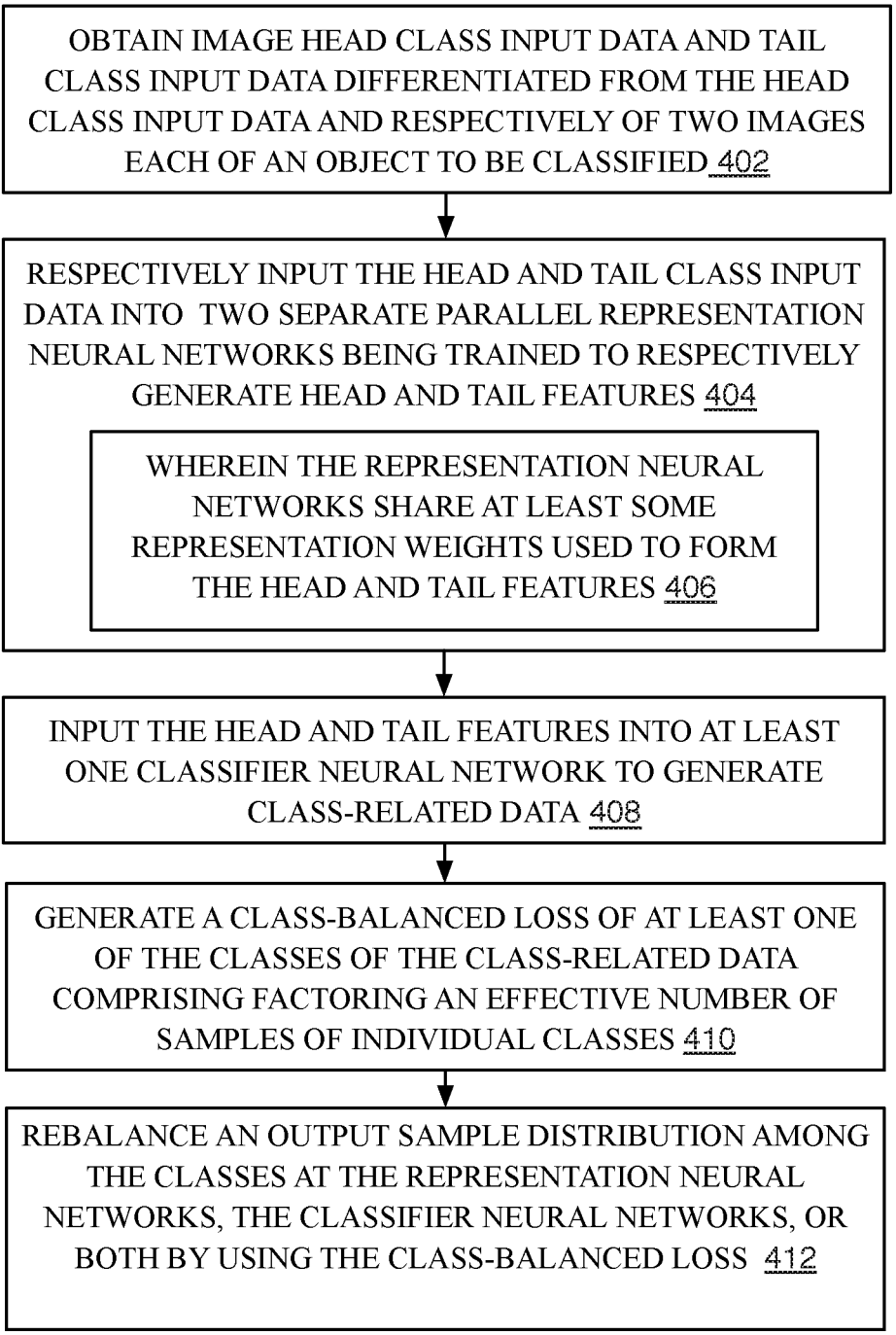
FIG. 4 is a flow chart of a method of image processing with image hashing object detection according to at least one of the implementations herein.

Referring to FIG. 4, a process 400 provides a method of image hashing object detection for image processing. In the illustrated implementation, process 400 may include one or more operations, functions or actions 402 to 412 numbered evenly. By way of non-limiting example, process 400 may be described herein with reference to example image processing system 900 of FIG. 9, and/or network 202 of FIGS. 2A-2B, and where relevant.

Process 400 may include "obtain image head class input data and image tail class input data differentiated from the head class input data and respectively of two images each of an object to be classified" 402. This may involve obtaining images from previously obtained datasets or databases of images with images collected specifically to train object detection neural networks. It most cases the dataset comes with the ground truth class of each object or image (or sample). Such datasets may be real-world datasets that have many more samples for each head class than tail class samples as described herein. Other images that are not in the dataset may be added and analyzed as well as part of the training input. By one form, this may include samples with an open class such that the sample does not have a predetermined class. The image data provided by each sample in the dataset or otherwise may be pixel data of a particular color and/or luminance scheme such as RGB, YUV, grayscale, and so forth.

This operation also may include determining which samples are head classes and which are tail classes. By one form, the dataset may be obtained with pre-defined classes as head or tail classes, and by other alternatives, the class identification unit may determine whether an object is a head class or tail class by comparing the ground truth class value of the sample to a threshold. This threshold may be fixed or vary.

This operation also may include then providing the head and tail samples to object detection neural networks to generate initial or direct head and tail features as the form of the image head class input data and image tail class input data. Such features are input to the representation neural networks to form more precise features sufficient for classification and generating accurate imaging hashes Process 400 may include "respectively input the head and tail class input data into two separate parallel representation neural networks being trained to respectively generate head and tail features" 404. As mentioned this may be twin networks or similar networks with similar layer structure, and this may be provided by many different types of representation neural networks. By one form, the tail representation network also handles open classes.

The operation 404 may include "wherein the representation neural networks share at least some representation weights used to form the head and tail features" 406. In other words, the representation neural networks should be at least sufficiently similar to be able to share the same weights. By one form, this is performed for at least some of the layers, and by another form, all layers of one of the representation networks shares weights with the other representation network. By one example form, all weights are shared except at fully connected layers and softmax layers for classification layers.

By one alternative form described herein, the output head and tail features may be provided to an adapter that uses an adaptor factor that modifies the head and tail features in an inversely correlated manner. This can increase the tail feature values and reduce the head feature values to compensate for the head bias.

Process 400 may include "input the head and tail features into at least one classifier neural network to generate class-related data" 408. Here, and whether or not the head and tail features were previously modified by the adaptor, a classifier learning unit may have classifiers that receive the head and tail features and output class probability vectors (or simply probabilities). The head and tail class probability vectors are then combined or cumulated to form a single probability vector that forms one version of the class-related data. The single probability vector may be used to form a hash as described herein.

Process 400 may include "generate a class-balanced loss of at least one of the classes of the class-related data comprising factoring an effective number of samples of individual classes" 410. Thus, a head and tail predicted class of the highest or other representative probability of the head and tail class probability vectors may be input into a class-balanced probability function. By some alternatives, the highest (or other representative) probability classes of the cumulated single probability vector may be input into the function instead. A direct loss is determined that represents a difference between a predicted class and the ground truth class of the same sample, with one direct loss for the head class and one for the tail class. The direct losses are then modified by a class-balancing loss factor that considers the effective number of samples of a class, and by one example, is an inverse of this value. The two modified direct losses then may be combined in the function to form the CBL. This factor better compensates for the head bias mentioned above. The output of the loss function is a class-balanced loss (CBL). The CBL then acts as a re-weighting or rebalancing parameter for adjusting or updating weights of the networks.

Thus, process 400 may include "rebalance an output sample distribution among the classes at the representation neural networks, the classifier, or both by using the class-balanced loss" 412. Thus, the CBL may be used in a weight adjustment equation to indirectly modify the network parameter weights of the representative neural networks, classifiers, or both, as described below. Specifically, the CBL, or in a more generic form referred to as a weight sum loss (WSL), may be minimized while setting network parameter weights in a weight updating equation such as a backpropagation (BP) algorithm. The CBL, WSL, or modified head or tail direct losses may be directly input to such equations, may be converted to cost values for example, or otherwise may be mapped to weight values in the BP or other updating algorithm that reduce the losses in subsequent iterations. Similarly, the losses also may be used to update the weights of the classifiers. The ultimate effect is to re-balance the network parameter weights of the representative and/or classifier networks.

By one form, the representation learning and classifier learning networks are run together until the representation neural network has weights that provide a sufficiently low loss. Thereafter, the weights on the representation neural network may be fixed, and the weights of the classifiers, and specifically the classifier neural networks, may be adjusted as mentioned above until the CBL is sufficiently low for the classifiers. Thus, by one example, a CBL value sufficient to fix the representation neural network weights is greater than the CBL sufficient for accurate classification.

Figure 5A:
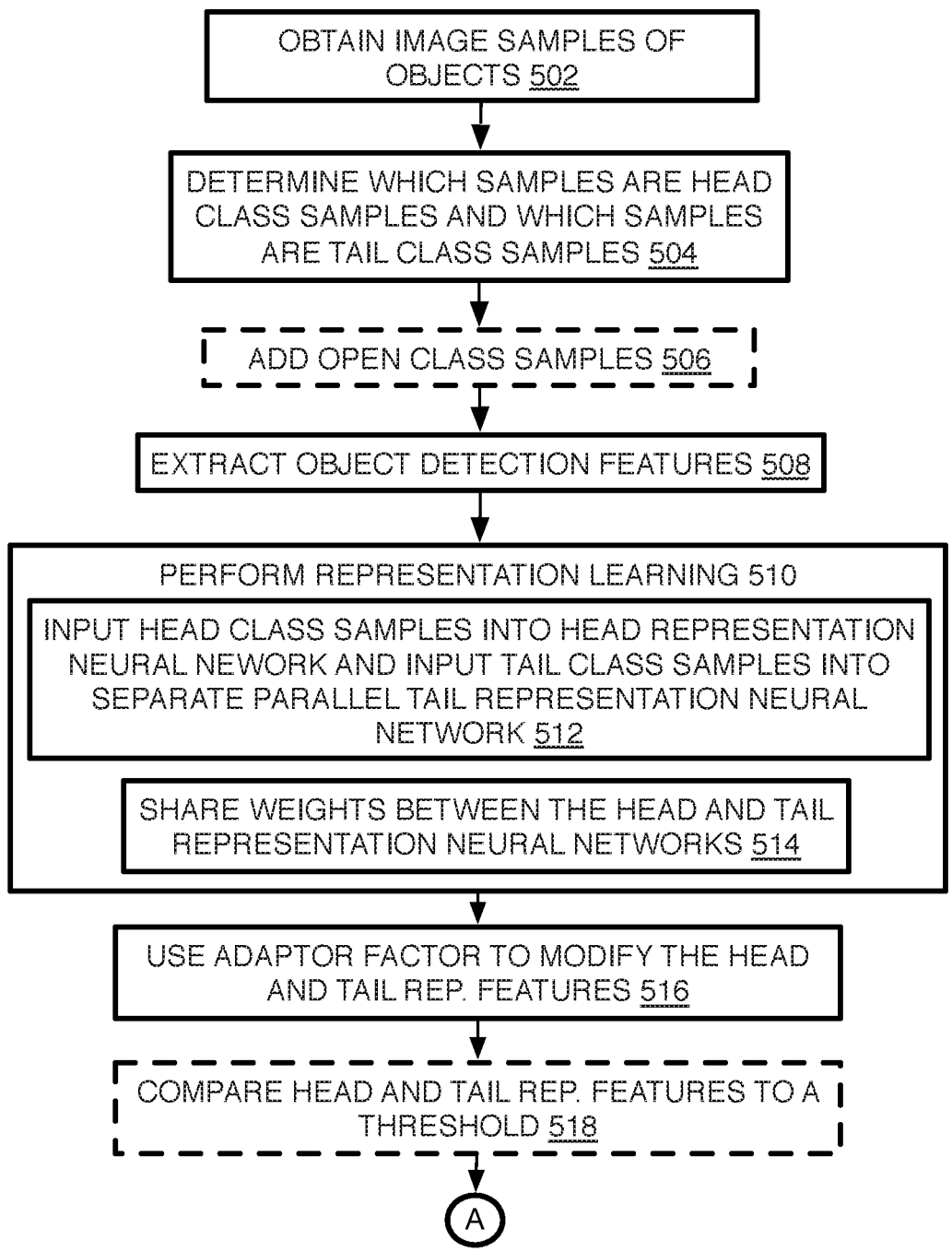
FIGS. 5A-5B is a detailed flow chart of a method of image processing with image hashing object detection according to at least one of the implementations herein.
Figure 5B:
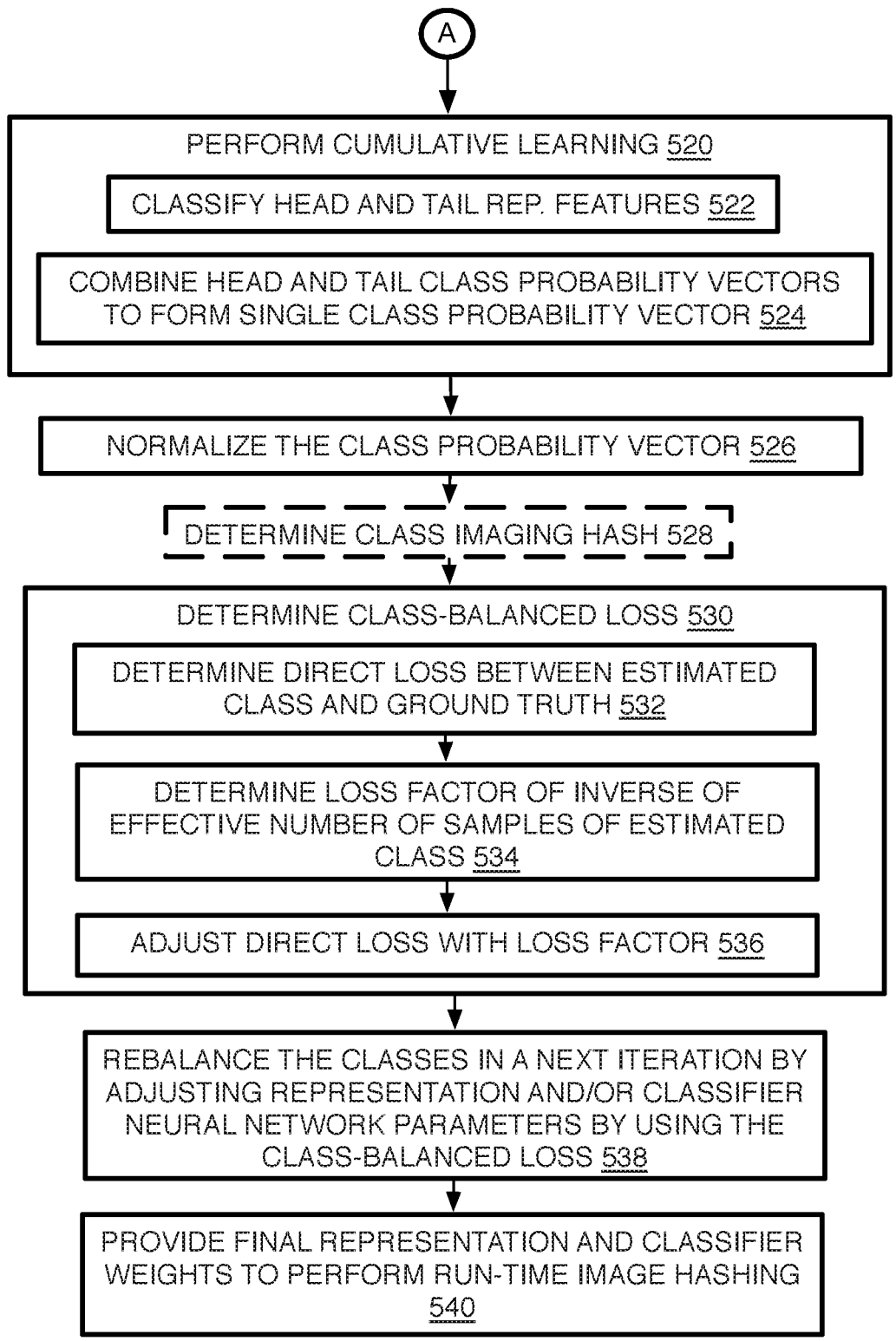

Referring to FIGS. 5A-5B, a process 500 provides a method of image hashing object detection for image processing. In the illustrated implementation, process 500 may include one or more operations, functions or actions 502 to 540 numbered evenly. By way of non-limiting example, process 500 may be described herein with reference to example image processing system 900 of FIG. 9, and/or network 202 of FIGS. 2A-2B, and where relevant.

Process 500 may include "obtain image samples of objects" 502, and as mentioned herein, by obtaining samples of available pre-made datasets, and by one form, real-world datasets with tail classes as mentioned herein. The datasets may provide image data as well as a ground truth class for each sample or image.

Process 500 may include "determine which samples are head class samples and which samples are tail class samples" 504. By one example, the datasets are provided with head class or tail class definitions. In this case, the class identifier unit 208 may simply read a head or tail indicator bit of each image or on an index of the samples. In other cases, the class identifier unit 208 compares the ground truth class number of the image to a threshold value. The threshold may be fixed and determined by heuristics for a particular dataset, and the threshold may change depending on the dataset. By another example, the threshold can vary depending on a number of factors including bit costs, loss values, and so forth.

By yet another example, a single branch can replicate the two branches by using an evolving sampling strategy. Specifically, the method first may mostly determine (or emphasize) head classes. As time passes, more emphasis may be put on tail classes. This may be done by shifting a soft threshold so that more classes are found to be tail classes over time.

Optionally, process 500 may include "add open class samples" 506. This also may include obtaining samples of open classes, especially when a certain object or objects needs to be recognized by the network being trained and are not already included in the dataset. The open class samples may be treated as tail class samples in this example.

Process 500 may include "extract object detection features" 508. For one input feature extraction example, both branches use the same residual network structure, and share all weights except for a last residual block. A residual is a difference between a mapping to be fit by a stack of layers forming the block and inputs to the block. See He, K, et al., "Deep residual learning for image recognition", CVPR (2016). The output is an initial or direct feature vector of intermediate values that represent the contents of the image or sample.

Process 500 may include "perform representation learning" 510. Also as mentioned, representation refers to representing an image or sample as a feature or feature vector. The direct feature from the object detection is found to be too imprecise for image hashing classification and often needs to be refined before being provided to a classifier or classification network for imaging hash generation.

The representation learning may include having process 500 "input head class samples into head representation neural network and input tail class samples into separate parallel tail representation neural network" 512. In other words, in the example form here, the representation unit 204 has the two representation neural networks 218 and 220 considered to be two parallel branches, one for the head classes and one for the tail classes.

Also as mentioned, the representation neural networks may be many different types of network that can share weights including twin or Siamese networks. By one example form mentioned above, the representative neural networks are open long tailed recognition networks that uses the visual memory feature 310. In operation, after the visual or direct features are extracted, the features are sent to the visual memory module 308 to enhance the representation ability of the feature by forming visual concepts. To create supervised updates from a small amount of data in the tail classes and open classes, the memory feature 310 enriches the direct feature by relating it to the visual concepts from the memory module 308. This mechanism is similar to the memory popular in meta learning. See Liu, Z., et al., "Large-Scale Long-Tailed Recognition in an Open World", CVPR (2019) for more details, and which is incorporated herein for all purposes. A number of different variations of the visual memory of the Liu network were tested and with some basis on Open Compound Domain Adaptation, CVPR, (2020). The values of the memory feature are then summed with the direct features 301 to form the output features. The resulting output of the head and tail representative neural networks is output head and tail representative (rep.) features or feature vectors $f\_h$, and $f\_t$, respectively, of intermediate elements or values that represent a sample and are sufficient for precise classifiers.

Process 500 may include "share weights between the head and tail representation neural networks" 514. By this example, the weight sharing unit 222 provides the same network parameter weights to at least some of the neural network layers in both the head and tail representative neural networks and that have the same layer structure and hyperparameters. By one form, all neural network layers of the representative neural networks that receive weights receive the same weights as the other network. By another form, the layers receive the same weights except the fully connected layers and classifier layers (SoftMax). The weights are updated by using the CBL as described herein with process 400 or 500.

Optionally, process 500 may include "use adaptor factor to inversely modify head and tail features output from the head and tail representation neural network depending on an epoch count" 514. Inverse here merely refers to inverse correlation or relationship so that when the head or tail feature values are increased, the other of the head or tail feature values are decreased. Specifically, and by one example, the predicted outputs of the two branches (the head and tail rep. features) may be inversely modified by the adaptor factor (adaptive parameter) to perform an adaptive trade-off or to shift the learning "attention" between the two branches in the classifiers of the classification learning stage 206. Once the head and tail features are modified, the modified features may be aggregated during the cumulative learning stage by the cumulative learning unit 232. Thus, the adaptor may or may not be considered a task of the cumulative learning unit 232.

The operation 514 may include "use adaptor factor to modify the head and tail representation features" 516. By one form, an adaptor factor a is automatically generated by the adaptor according to a number of training epochs as shown by graph 226, which adjusts the network model 200 to first learn universal head features from the original distribution and then pay more attention to the tail data gradually over time as more samples are being analyzed. In detail, the adaptor factors are set as $\alpha$ and $1-\alpha$, and the modified feature vectors are then of $\alpha f\_h$ and $(1-\alpha)f\_t$ so that the smaller the adaptor factor with each pass or epoch, the smaller the head feature values and the greater the tail feature values. The result is modified head and tail rep. features or feature vectors.

Also, the adaptor factor could be used to control the parameter updating of each representative branch, which, for example, avoids damaging the head features when emphasizing the tail data at the later periods of training. In other words, the adaptor factor can control the parameter updating by setting the weights for each output and in a way that still avoids damage to the head features by maintaining the dominance of the head class recognition during the representation learning. This occurs by having the adaptor's influence result in the setting of larger representation weights for the head class branch than the other branch and to be used during representation learning.

Alternatively, process 500 may include "compare the head and tail output features to a threshold" 518 instead of using the adaptor. This may be a hard or fixed training performance threshold, where a feature can be used as long as the model's or network's 200 performance reaches the threshold. In this case, the representation learning (of convolution layers) output head and tail rep. features are fixed and the classifier learning is tuned by rebalancing techniques explained below.

Next, process 500 may include "perform cumulative learning" 520, and this may include "classify head and tail rep. features" 522. Accordingly, the modified head and tail features are input to respective classifier networks $W_h$ 234 and $W_t$ 236 to generate classifier output as head and tail class probability vectors 240 and 242. The classifier weights unit 238 may provide different weights to the two classifiers 234 and 236 but some or all of the weights could be the same for the classifiers. Each class probability vector 240 and 242 has elements that are each a probability that the sample is a different available class.

Process 500 may include "combine head and tail class probability vectors to form a single class probability vector" 524, which performs the cumulative operation of the cumulative learning stage. By one form, this may involve performing element-by-element summation 244 of the probabilities of the head and tail class probability vectors 240 and 242. Other functions or operations could be used instead.

Process 500 may include "normalize the class probability vector" 526, where a normalization algorithm such as softmax may be used to normalize each of the probability elements in the class probability vector and at the normalization unit 248.

Optionally, process 500 may include "determine class imaging hash" 528. The hash may be generated during the training in order to imitate the run-time network. The hash operation first involves using a $tanh(\lambda x)$ activation function unit (or pre-hash unit) 250 to convert the bit-size of the normalized feature to a size desired for a hash code as well as provide a binary vector that can be used in hashing algorithms. This can be performed in two layers. The first layer is a fully connected layer that maps the output of the normalization to the desired hash code length. For example, a normalization layer with an example 100-dimension (100 bit) output may be mapped to a 128-dimension hash by a 100*128 fully connected layer. The second layer performs the $tanh(\lambda x)$ activation function for each element of the 128-dimension hash output. $\lambda$ is a hyper-parameter where for each element x of the 128-dimension output, after $tanh(\lambda*x)$ is computed, the computed value is compared to a threshold to output a 0 or 1. For example:

$$p = \begin{cases} 1, & \text{if } tanh(\lambda x) > 0.5 \\ 0, & \text{else} \end{cases} \quad (1)$$

where p represents a class probability of one of the elements in the cumulated class vector, and the 0.5 threshold is determined by experimentation. This is used as input to generate a hash value.

Then, the hash may be computed. The hashing unit or operation h 252 may be a plug-in module of a typical image classification network in order to obtain the hashing code. The hashing algorithm may be a type related to an average hash, blockhash, difference hash, median hash, perceptual hash, wavelet hash, and so forth. Here, the output of hashing layer h 252 is a corresponding hashing code in the form of a binary vector or hash code vector that identifies a specific image or specific image content or object, but not necessarily a single class.

Thereafter, the system may de-map the hashing or class probability vector back to its original length with a de-mapping (or post-hash) unit 254. So for example, the vector will be sized as follows:

(normalized output) 100d→(fully connected layer output) 128d→(fully connected layer) 100d The resulting output feature vector then can be used for loss computation and re-balancing if desired.

Process 500 then may include "determine class-balanced loss" 530. This may be partly based on the concept that as the number of samples increases, the additional benefit of a newly added data point will diminish because added points often overlap (or have the same image or object as already collected points). Thus, by computing a loss by factoring an effective number of samples of a class that discounts overlapping samples that do not add new image data, the loss can be used to provide network weights for a more accurate balance between head and tail class distribution. This operation can be considered as validating the samples (by avoiding overlaps) while rebalancing the loss, which in turn will cause re-weighting or re-balancing of the sample distribution. Thus, more precisely, a class-balanced loss is provided to adjust or update the network weights to perform re-weighting to rebalance the sample distribution between head and tail classes, and provide for long-tailed, few shot hashing. See Cui, Y., et al., Class-Balanced Loss Based on Effective Number of Samples. CVPR 2019 for more details.

Figure 6:
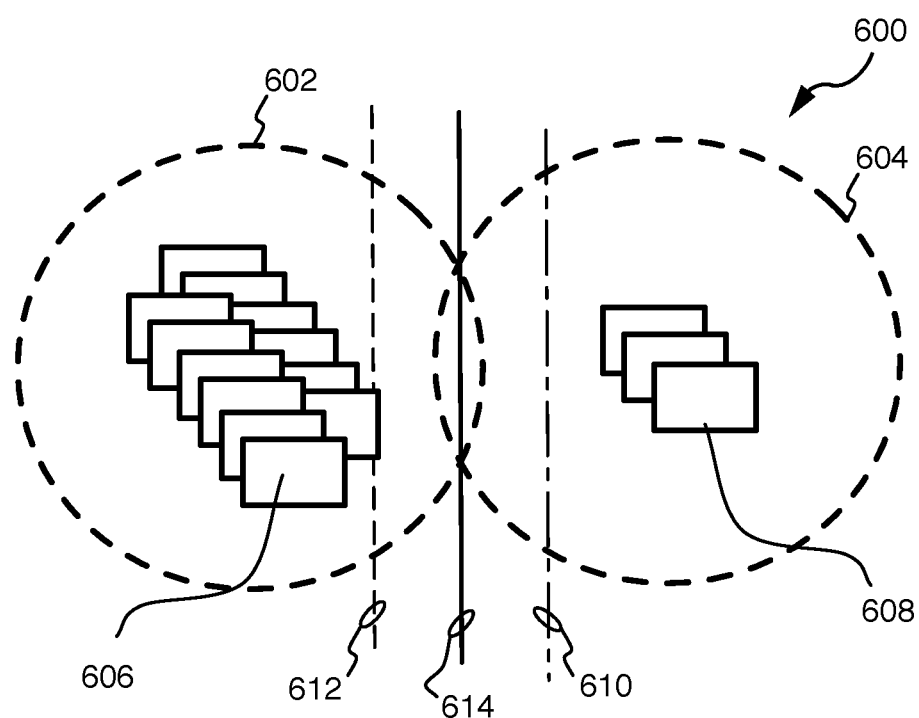
FIG. 6 is a graph showing resulting class representation using the methods disclosed herein.

Referring to FIG. 6, a graph of feature space 600 demonstrates the accuracy of a system that uses the class-balanced loss. Thus, a space of all samples 602 and all tail samples 604 of a class each respectively have a number of effective samples 606 and 608. Conventional imaging hash networks with no re-weighting over-emphasize the head samples such that a line 610 shows the divide between predicted head and tail classes. Re-weighting by using an inverse class frequency over-compensates and results in a dividing line 612 that places too much attention on the tail classes. The class-balanced loss based network as described herein places its resulting dividing line 614 where it should be and where the image hashing is most accurate, which is at the intersection of the head and tail sample spaces 602 and 604.

Now to compute the class-balanced loss, this technique creates an analogy to a geometrical algorithm of random covering and uses a volume of all possible data (or samples) in a feature space N for a single class to form a hyper-parameter β. First then, a direct loss is modified by a loss factor as follows:

$$L_{CB}(\hat{y}, y) = \frac{1}{E_{n_y}} L(\hat{y}, y) = \frac{1-\beta}{1-\beta^{n_y}} L(\hat{y}, y) \quad (2)$$

where $L_{CB}(\ )$ is a class-balanced loss for head class or tail class, where y is ground truth of the correct class, $\hat{y}$ is the prediction or estimate of the class, and $L(\ )$ is direct loss computed as a measure or representation of the difference between the prediction class $\hat{y}$ and ground truth class y. For each sample belonging to a particular class, the hyper-parameter β is a representative of the volume N of the set of all possible samples (or feature data) for the particular class, and by one form, where:

$$\beta = (N-1)/N \quad (3)$$

$$E_{n_y} = (1-\beta^{n_y}/1-\beta) \quad (4)$$

$E_{n_y}$ represents the effective number of samples of the particular class y, and $1/E_{n_y}$ is a weighting factor which is estimated by the use of the hyper-parameter β, and where $\beta \in [0; 1)$ and $n_y$ is the actual number of samples in the class y. Thus, a sample from a class with different sample numbers than another class will be differently re-weighted by $1/E_{n_y}$. Note that when β=0, this corresponds to no re-weighting, and β→1 (approaching 1) corresponds to re-weighting by the reciprocal of the actual number of samples of a class.

Process 500 may include "determine direct loss between estimated class and ground truth" 532. This first involves determining the prediction class $\hat{y}$, which can be obtained from a number of different vectors, as shown by the dashed arrows on network 200. By one form, the modified direct loss $L_{CB}$ is computed twice, once for a sample from a head class and once for another sample from a tail class. By one form, this is accomplished by obtaining an estimate or predicted class $\hat{y}$ from each separate head and tail probability vector 240 and 242 from the classifiers and in a version that existed before the two vectors were cumulated.

By another option, the cumulated vector is used, whether before or after normalization, or after hash de-mapping by de-mapping unit or post-hash unit 254. In these cases, the probability vector will have two probability peaks, one for head classes and one for tail classes. The system determines which two classes are represented by these two peaks to establish a head predicted class $\hat{y}_h$ and tail predicted class $\hat{y}_t$. No matter which prediction or probability vector is used, by one form, the class with the top two highest probabilities in a vector is taken as the representative prediction class $\hat{y}_h$ and $\hat{y}_t$. Once the predicted class $\hat{y}_h$ and $\hat{y}_t$ is determined, the ground truth $\hat{y}_h$ and $\hat{y}_t$ of the same two samples can be looked up on an index of the dataset used by the classifiers.

To compute the direct loss then, a difference between the predicated class $\hat{y}$ and ground truth class y is determined. The direct loss $L(\ ))$ from equation (1) above is not particularly limited and may be any known or desirable loss algorithm such as direct subtraction, mean square error (MSE), mean absolute error (MAE), mean bias error (MBE), cross-entropy error, hinge loss, -and so forth.

Process 500 next may include "determine loss factor of inverse of effective number of samples of estimated class" 534. Thus, once the ground truth is determined, the inverse of an effective number of samples $E_{n_y}$ of the ground truth class y may be computed per equations (2) and (3) above to generate the loss factor.

Process 536 may include "adjust direct loss with loss factor" 536. Here, equation (1) is applied separately to modify the head and tail loss. The loss factor may be multiplied by, or otherwise applied to, the direct loss to generate separate modified head and tail losses (or head and tail class-balanced losses) $L_{CB}(\ )$ as shown by equation (1).

Once the two modified head and tail direct losses are obtained for both head and tail input samples, a single CBL value may be generated by combining the losses, by average, sum, or other desired combination operation or function. Thus, the modified head and tail losses are combined to form a single CBL (or $L_{CB}$ sum) value:

$$CBL = L_{CB\ sum} = L_{CB}(\hat{y}_h, y_h) + L_{CB}(\hat{y}_t, y_t) \quad (5)$$

Process 500 may include "rebalance the classes in a subsequent iteration by adjusting representation and/or classifier neural network parameters by using the cross-balanced loss" 538, and this operation performs the rebalancing or re-weighting of the network parameter weights of the network. By one form, the CBL may be represented by a more generic class weight adjusting algorithm, where for each iteration i:

$$WSL = WT_{h,i} * L_{CB}(\hat{y}_h, y_h) + WT_{t,i} * L_{CB}(\hat{y}_t, y_t) \quad (6)$$

where the weights WT are further class balancing weights that can be used, and where the $L_{CB}(\ )$ is the modified direct loss or "loss of class" that factors effective number of samples from equation (1). CBL is a specific form of WSL where $WT_{h,i} = WT_{t,i} = 1$. The weights can be determined by further class balancing algorithms or experimentation. The weights can represent updating from iteration to iteration by:

$$WT_{h,(i+1)} = WT_{h,i} - C \quad (7)$$

$$WT_{t,(i+1)} = WT_{t,i} + C \quad (8)$$

and where C is a constant with a small value and determined by experimentation.

Thereafter, the CBL, WSL, or weighted modified direct losses (the $WT * L_{CB}(\ )$ term) may be used in a network parameter weight updating equation to indirectly modify the network parameter weights of the representative neural networks, classifiers, or both. Specifically, these losses may be minimized while setting network parameter weights in a weight updating equation such as a backpropagation (BP) algorithm. The CBL, WSL, or weighted and modified head or tail direct losses may be directly input to such updating algorithms, may be first converted to desired cost values for example, or otherwise may be mapped to weight values in the BP or other updating algorithm that reduces the losses in subsequent iterations of the head and tail representation network. Similarly, the losses also may be used to update the network parameter weights of the classifiers. The ultimate effect is to re-balance the network parameter weights of the representative and/or classifier networks, thereby rebalancing an output sample distribution among the classes at the representation neural networks, classifier neural networks, or both by using the class-balanced loss.

One example training strategy is to initially train both the classifiers $W_h$ and $W_t$ and the representation neural networks together. Once the representation neural network is sufficiently accurate, then the weights of the representation neural network may be fixed and the training continues for the classifiers. This indicates and includes that the acceptable loss of the representation networks is greater than the acceptable loss for the classifiers. By one form, this transition can be performed gradually by fixing the weights of only single or some of the layers in the representation neural networks, and then adding layers to have fixed weights with increasing number of epochs. For example, an updating algorithm using gradient descent may have a step hyperparameter \alpha. Every certain epochs (100, 150, or 200 for example), can use a reduced \alpha by a constant a until \alpha is less than a threshold. See www.youtube.com/watch?v=b4Vyma9wPHo.

Process 500 may include "provide final representation and classifier weights to perform run-time image hashing" 540. After a sufficient number of epochs and a sufficiently minimized class-balanced loss is generated, the weights can be considered final and provided for run-time operations. This may include providing the weights as software or firmware with the object classification itself or image hashing.

Experimental Results

Two balanced (without a tail) benchmarks and four long-tailed benchmarks were sampled and based on Cifar100 and ImageNet100 datasets. To extract a long-tailed dataset, images were sampled according to Zipf's law (or rank-size property, see Reed, W. J., "The Pareto, Zipf and other power laws" Economics letters (2001)). The following equation was used to control the imbalance:

$$n(i)=n(1) \times i^{\{-\mu\}} \quad (9)$$

where n( ) is an index the number of samples for class index i, and μ is a hyper-parameter to control the unbalance degree, such that the imbalance factor (IF) is n(1)/n(C) where C here is the total number of classes indexed as 1, 2, . . . C.

Figure 7:
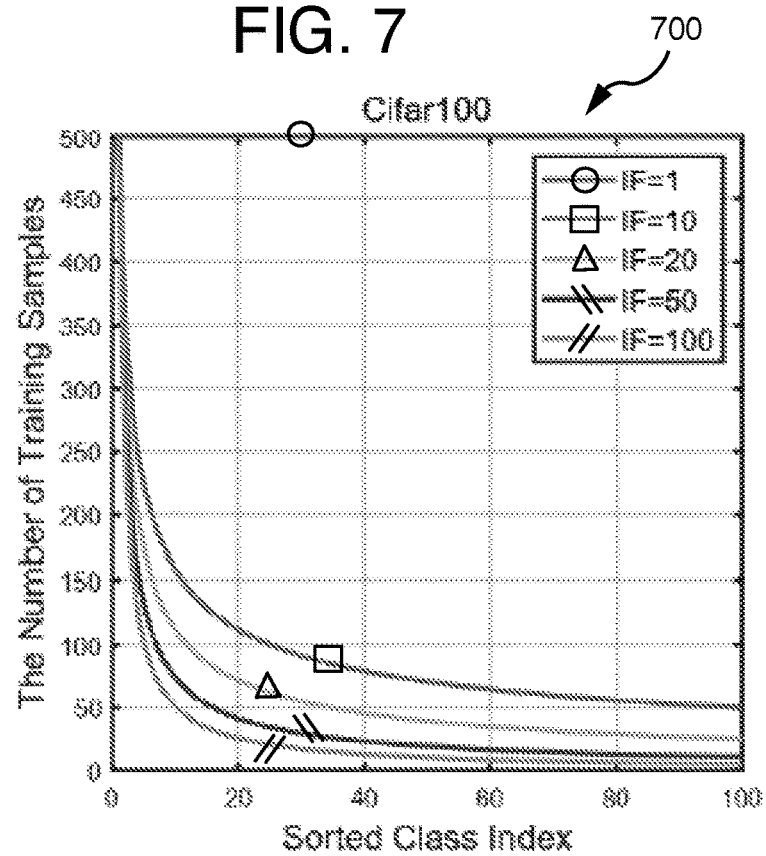
FIG. 7 is a graph showing sorted class index versus number of training samples for a Cifar100 dataset used for testing the image processing method disclosed herein and according to at least one of the implementations herein.
Figure 8:
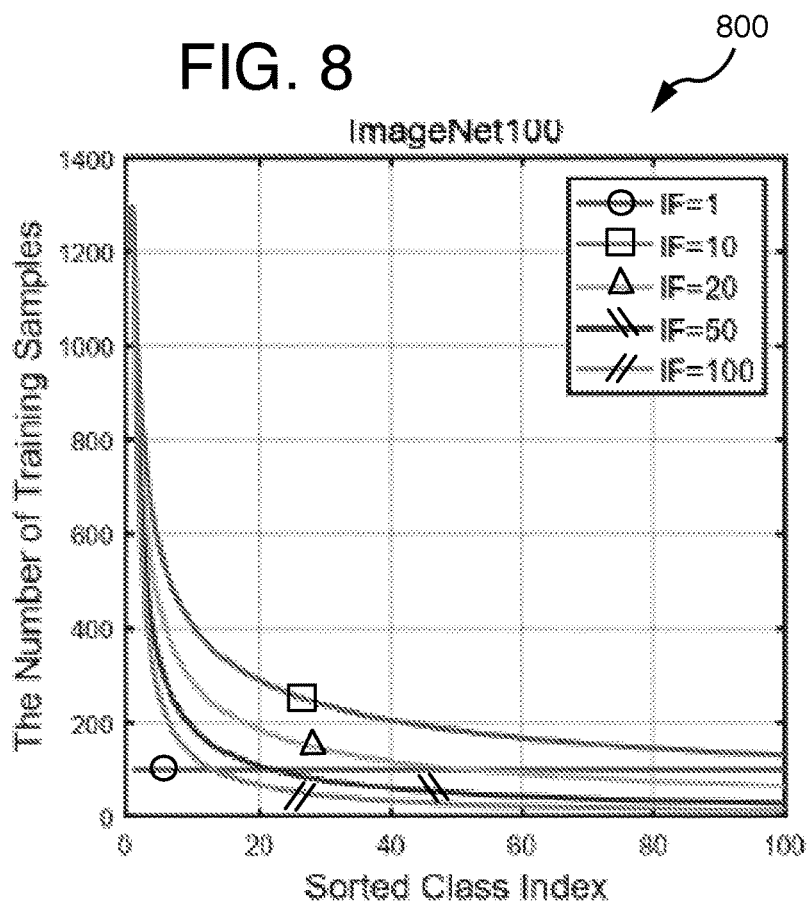
FIG. 8 is a graph showing sorted class index versus number of training samples for a ImageNet100 dataset used for testing the image processing method disclosed herein and according to at least one of the implementations herein.

For each dataset, long-tailed training sets with various parameters were used where n(1)=500, μ=0.0, 0.83, and 0.99 of randomly chosen images from the database, and the number of samples of each class obeys the Zipf's law. Three long-tailed benchmarks with different IFs (1, 10, 20, 50, and 100) were generated as is shown on the graphs of FIGS. 7-8. Graphs 700 and 800 show the curves of curated datasets with various IFs.

The performance of the present method is shown below on Table 1 and compared with conventional shallow and deep hashing methods, which were out performed by the present method. IF=10 or 20 with long-tailed datasets. The present method is listed as long tail hashing (LTH). The details for making the comparisons can be found at Yongyuan, yongyuan.name/blog/codes-of-hash-for-image-retrieval.html.

TABLE 1

MAP scores of all methods on Cifar100 and ImageNet100 datasets

| Settings/ | Cifar100 | | | | | | ImageNet100 | | | | | |
|---|---|---|---|---|---|---|---|---|---|---|---|---|
| MAP/ | IF = 10 | | | IF = 20 | | | IF = 10 | | | IF = 20 | | |
| Methods | 32 bits | 64 bits | 96 bits | 32 bits | 64 bits | 96 bits | 32 bits | 64 bits | 96 bits | 32 bits | 64 bits | 96 bits |
| LSH | 0.0355 | 0.0470 | 0.0606 | 0.0313 | 0.0468 | 0.0620 | 0.0604 | 0.1078 | 0.1498 | 0.0566 | 0.1087 | 0.1502 |
| PCAH | 0.0558 | 0.0624 | 0.0613 | 0.0543 | 0.0611 | 0.0613 | 0.1463 | 0.1937 | 0.1956 | 0.1444 | 0.1901 | 0.1959 |
| ITQ | 0.0761 | 0.0920 | 0.0966 | 0.0727 | 0.0880 | 0.0948 | 0.1979 | 0.2719 | 0.2908 | 0.1917 | 0.2617 | 0.2851 |
| KNNH | 0.0776 | 0.0936 | 0.1003 | 0.0743 | 0.0893 | 0.0959 | 0.1978 | 0.2764 | 0.3004 | 0.1938 | 0.2689 | 0.2914 |
| SDH | 0.1432 | 0.1835 | 0.2024 | 0.1281 | 0.1633 | 0.1764 | 0.4369 | 0.5058 | 0.5332 | 0.4032 | 0.4757 | 0.5010 |
| COSDISH | 0.0970 | 0.1353 | 0.1591 | 0.0858 | 0.1139 | 0.1297 | 0.2888 | 0.3854 | 0.4391 | 0.2529 | 0.3547 | 0.4010 |
| FastHash | 0.1230 | 0.1699 | 0.1932 | 0.0944 | 0.1314 | 0.1549 | 0.3385 | 0.4306 | 0.4716 | 0.2959 | 0.3926 | 0.4389 |
| FSSH | 0.1416 | 0.1951 | 0.2133 | 0.1223 | 0.1597 | 0.1833 | 0.3957 | 0.4714 | 0.5156 | 0.3986 | 0.4767 | 0.5177 |
| SCDH | 0.1742 | 0.2170 | 0.2353 | 0.1493 | 0.1884 | 0.2010 | 0.4838 | 0.5496 | 0.5772 | 0.4553 | 0.5247 | 0.5515 |
| DPSH | 0.1724 | 0.2552 | 0.2929 | 0.1457 | 0.1895 | 0.2220 | 0.2580 | 0.3155 | 0.3601 | 0.2404 | 0.3324 | 0.4091 |
| HashNet | 0.2764 | 0.3491 | 0.3742 | 0.2272 | 0.2651 | 0.2900 | 0.3874 | 0.4437 | 0.4800 | 0.3708 | 0.4339 | 0.4748 |
| DSDH | 0.2306 | 0.2027 | 0.1770 | 0.1612 | 0.1442 | 0.1332 | 0.3988 | 0.4827 | 0.4380 | 0.3622 | 0.3479 | 0.3167 |
| LTH | 0.4192 | 0.4752 | 0.4910 | 0.3410 | 0.3895 | 0.4160 | 0.8001 | 0.8222 | 0.8341 | 0.7748 | 0.8074 | 0.8241 |
| LTH$_{linear}$ | 0.4184 | 0.4412 | 0.4622 | 0.3333 | 0.3384 | 0.3600 | 0.7298 | 0.7643 | 0.8054 | 0.6399 | 0.6837 | 0.7346 |

Hash code lengths vary from 32, 64, and 96 bits as shown.

In addition, any one or more of the operations explained with the methods of FIGS. 4 and 5A-5B, and neural networks of FIGS. 2A-2B, may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or fixed function firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or fixed function firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
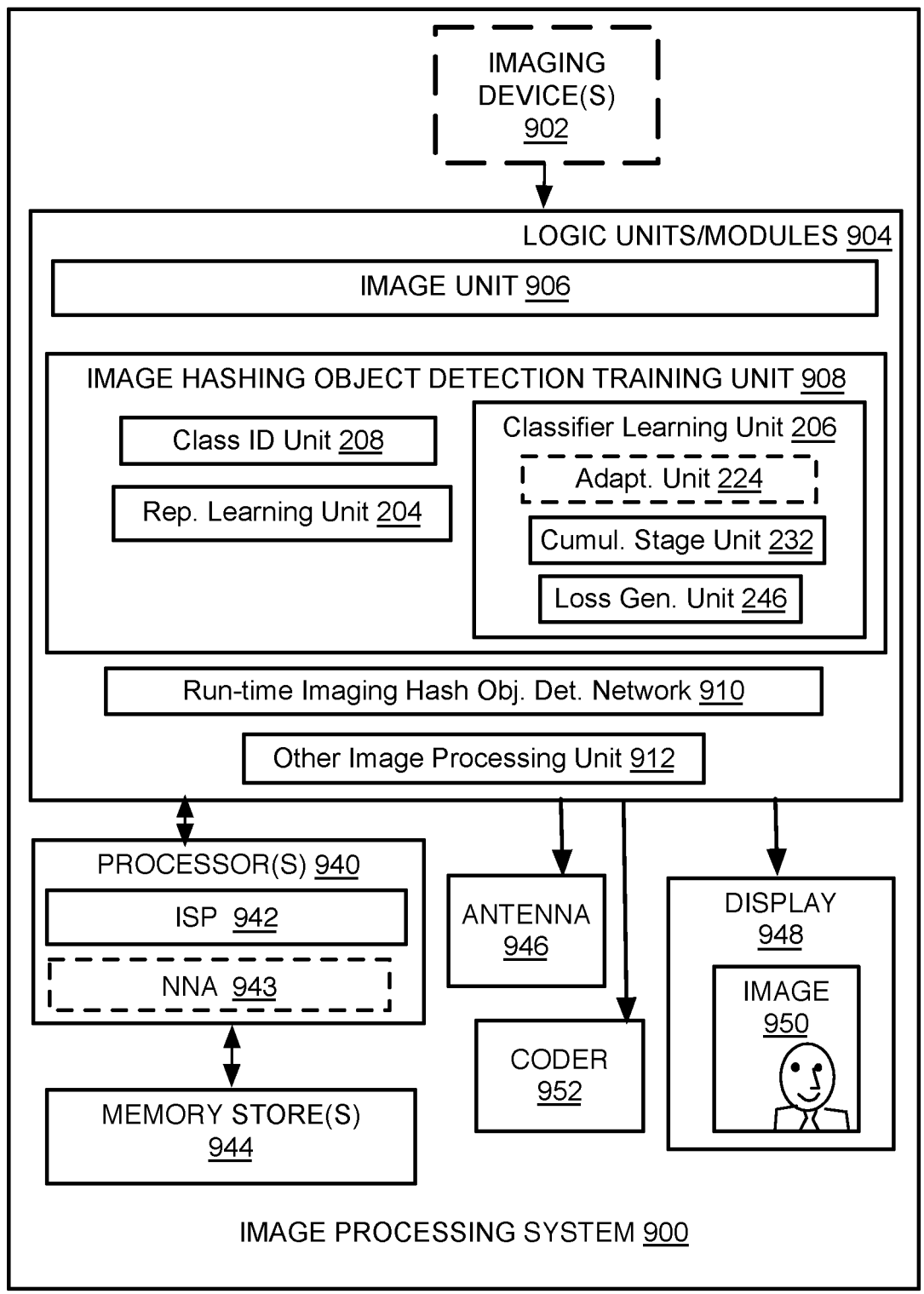
FIG. 9 is an illustrative diagram of an example system.

Referring to FIG. 9, an example image processing system 900 is arranged in accordance with at least some implementations of the present disclosure. In various implementations, the example image processing system 900 optionally may have one or more imaging devices 902 to form or receive captured image data. This can be implemented in various ways. Thus, in one form, the image processing system 900 may be one or more digital cameras or other image capture devices, and imaging device 902, in this case, may be the camera hardware and camera sensor software, module, or component. In other examples, imaging processing system 900 may have one or more imaging devices 902 that includes or may be one or more cameras, and logic modules 904 may communicate remotely with, or otherwise may be communicatively coupled to, the imaging devices 902 for further processing of the image data.

Thus, image processing system 900 may be a single camera alone or on a multi-camera device either of which may be a smartphone, tablet, laptop, computer, or other mobile device, or could be computer vision cameras and sensors, and/or VR, AR, or MR headsets, glasses or other headwear positioned over a person's eyes. The cameras may capture images in either visible or non-visible spectrums. Otherwise, image processing system 900 may be the device with multiple cameras where the processing occurs at one of the cameras or at a separate processing location communicating with the cameras whether on-board or off of the device, and whether the processing is performed at a mobile device or not.

Thus, by one form, it will be understood that image processing system 900 sufficient to perform the image hashing object detection described above may be a computer or server for example without any mounted cameras on the same device performing such processes or attachment to remote cameras.

In any of these cases that include a camera, such technology may include a camera such as a digital camera system, a dedicated camera device, or multi-purpose device such as an imaging phone or tablet. Thus, in one form, imaging device 902 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 902 also may have a lens, an image sensor with a RGB Bayer color filter, an analog amplifier, an A/D converter, other components to convert incident light into a digital signal, the like, and/or combinations thereof, and/or other components when camera or sensor captures images that are not in the visible domain. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor also may support other types of electronic shutters, such as global shutter in addition to, or instead of, rolling shutter, and many other shutter types. In other examples, an RGB-Depth camera and/or microphone-array might be used in the alternative to a camera sensor. In these examples, in addition to a camera sensor, the same sensor or a separate sensor may be provided as well as light projector, such as an IR projector to provide a separate depth image that can be used for triangulation with the camera image. Otherwise, the imaging device may have any other known technology for providing depth maps by using multiple camera or imaging devices, or a single imaging device.

In the illustrated example and relevant here, the logic modules 904 may include an image unit 906 that performs pre-processing on raw image data or images from a pre-formed image sample dataset such as a real-world dataset as mentioned above, and where the pre-processing is at least sufficient for image hashing object detection. This may include conversion of image data to whatever formats are needed such as generating a depth map or depth image.

The logic modules also may have an image hashing object detection training unit 908 that has the class identification unit 208, representation learning unit 204, and a classifier learning unit 206 optionally with an adaptor stage unit 224, and with a class estimation unit (or cumulative stage unit) 232 and a loss generation unit 246 (also referred to as a re-weighting unit or rebalancing unit) that uses a loss function that provides rebalancing class-balanced loss values as well as any of the other units related to the object detection training described above. These units perform operations already described above.

The image processing system 900 may have one or more processors 940 which may include a dedicated hardware or firmware such as an image signal processor (ISP) 942 such as the Intel Atom, or neural network accelerator (NNA), memory stores 944, one or more displays 948 to provide images 950, a coder 952, and antenna 946. In one example implementation, the image processing system 900 may have the display 948, at least one processor 940 communicatively coupled to the display, and memory stores 944 communicatively coupled to the processor. The coder 952 may be an encoder, decoder, or both. Otherwise, the processed image 950 may be displayed on display 948 or stored in memory stores 944. As illustrated, any of these components may be capable of communication with one another and/or communication with portions of logic modules 904 and/or imaging device 902. Thus, processors 940 may be communicatively coupled to both the image device 902 and the logic modules 904 for operating those components. By one approach, although image processing system 900, as shown in FIG. 9, may include one particular set of blocks or actions associated with particular components or modules, these blocks or actions may be associated with different components or modules than the particular component or module illustrated here.

Figure 10:
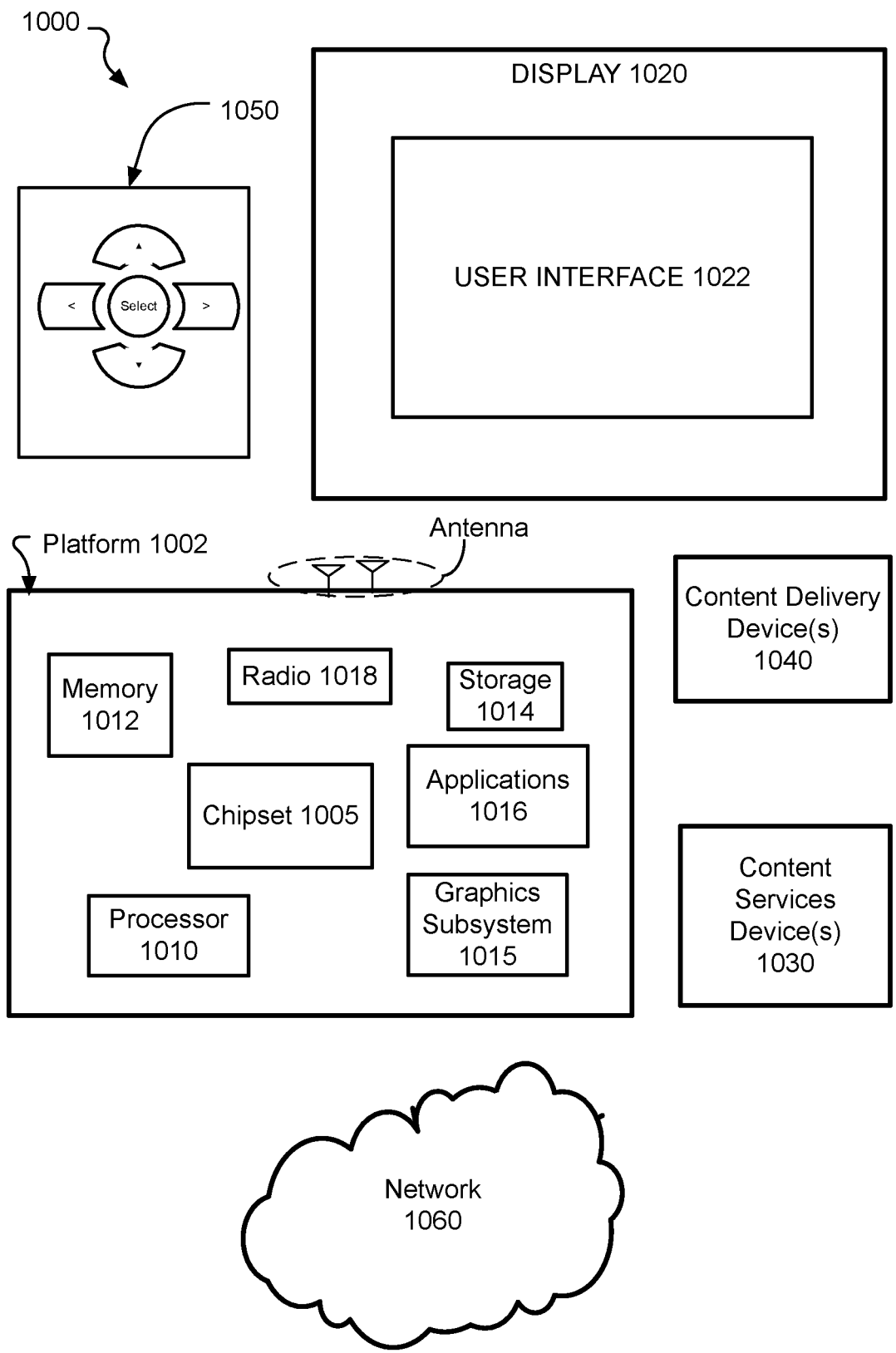
FIG. 10 is an illustrative diagram of another example system.

Referring to FIG. 10, an example system 1000 in accordance with the present disclosure operates one or more aspects of the image processing system described herein. It will be understood from the nature of the system components described below that such components may be associated with, or used to operate, certain part or parts of the image processing system 1000 described above, and therefore, used to operate the methods described herein. In various implementations, system 1000 may be a media system although system 1000 is not limited to this context. For example, system 1000 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In implementations, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, text ("texting") message, social media formats, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
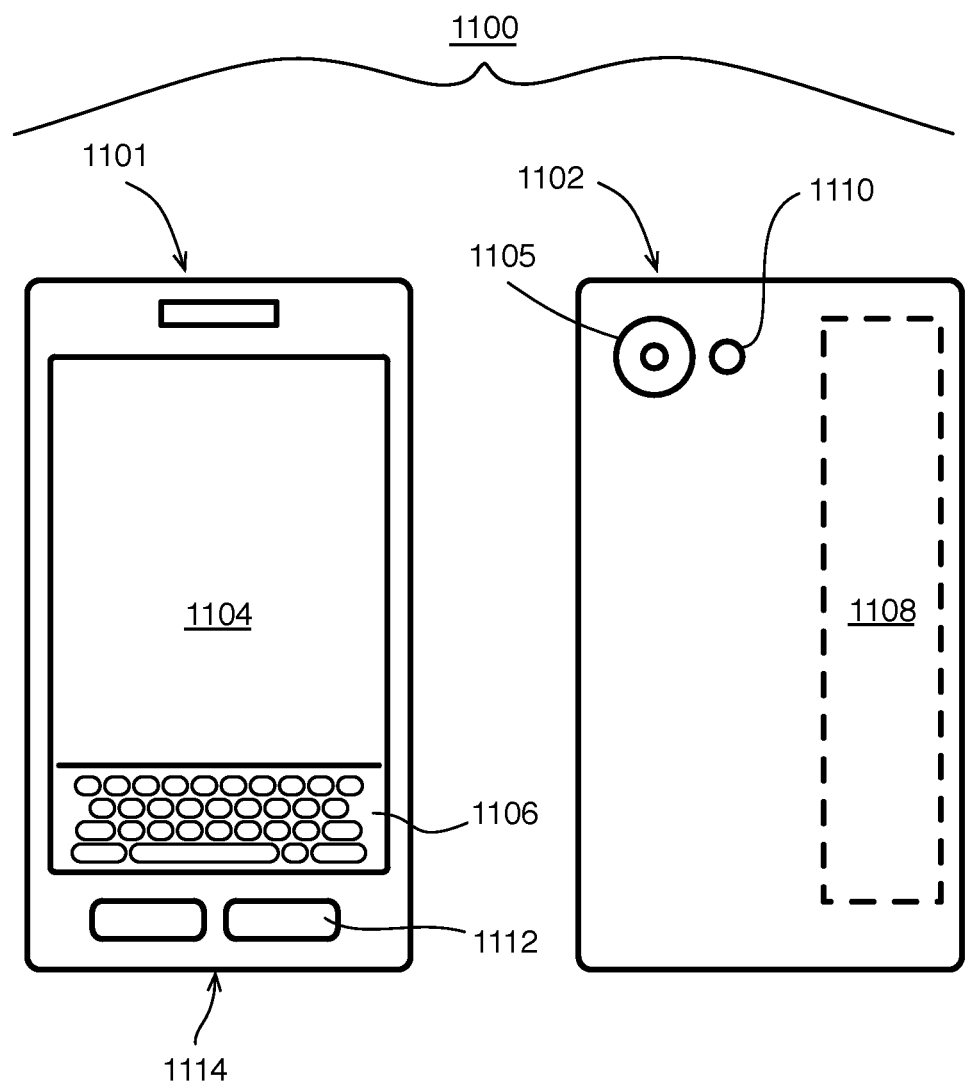
FIG. 11 illustrates another example device, all arranged in accordance with at least some implementations of the present disclosure.

Referring to FIG. 11, a small form factor device 1100 is one example of the varying physical styles or form factors in which systems 900 or 1000 may be embodied. By this approach, device 1100 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone 1114, or may be digitized by a voice recognition device. As shown, device 1100 may include a camera 1105 (e.g., including at least one lens, aperture, and imaging sensor) and an illuminator 1110, such as those described herein, integrated into back 1102 (or elsewhere) of device 1100. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method comprises obtaining image head class input data and image tail class input data differentiated from the head class input data and respectively of two images each of an object to be classified; respectively inputting the head and tail class input data into two separate parallel representation neural networks being trained to respectively generate head and tail features, wherein the representation neural networks share at least some representation weights used to form the head and tail features; inputting the head and tail features into at least one classifier neural network to generate class-related data; generating a class-balanced loss of at least one of the classes of the class-related data comprising factoring an effective number of samples of individual classes; and rebalancing an output sample distribution among the classes at the representation neural networks, classifier neural networks, or both by using the class-balanced loss.

By one or more second implementation, and further to the first implementation, the method comprises determining whether individual samples forming the input data are head class samples or tail class samples before providing the samples as input to the representation learning neural networks.

By one or more third implementations, and further to the first implementation, wherein the method comprises the method comprises determining whether individual samples forming the input data are head class samples or tail class samples before providing the samples as input to the representation learning neural networks, and wherein the determining comprises obtaining the ground truth of a class of a sample; and comparing a class number of the sample to a class threshold.

By one or more fourth implementations, and further to any of the first to third implementation, wherein generating the class-balanced loss comprises using a loss function that combines the losses of a head class image and a tail class image.

By one or more fifth implementations, and further to any of the first to fourth implementation, wherein both of the representation neural networks have substantially the same layer structure.

By one or more sixth implementations, and further to any of the first to fifth implementation, wherein all of the weights are shared when the representation neural networks have identical structure.

By one or more seventh implementations, and further to any of the first to fifth implementation, wherein all of the weights are shared except fully connected layers or softmax layers.

By one or more eighth implementations, and further to any of the first to seventh implementation, wherein the method comprising receiving corresponding head and tail features output from the representation neural networks; and at least generally inversely modifying the corresponding head and tail features relative to each other.

By one or more ninth implementations, and further to any of the first to seventh implementation, wherein the method comprising receiving corresponding head and tail features output from the representation neural networks; and at least generally inversely modifying the corresponding head and tail features relative to each other, wherein an adaptor factor changes to increase the value of tail features more as a number of features output from the representation neural networks increases.

By one or more tenth implementations, and further to any of the first to ninth implementation, wherein the method comprising receiving a version of corresponding head and tail features and received respectively at two classifiers to generate a head class probability vector and a tail class probability vector that each list probabilities of a plurality of available classes.

By one or more eleventh implementations, and further to any of the first to ninth implementation, wherein the method comprising receiving a version of corresponding head and tail features and received respectively at two classifiers to generate a head class probability vector and a tail class probability vector that each list probabilities of a plurality of available classes, and wherein a version of the head and tail class probability vectors form the class-related data.

By one or more twelfth implementations, and further to any of the first to ninth implementation, wherein the method comprising receiving a version of corresponding head and tail features and received respectively at two classifiers to generate a head class probability vector and a tail class probability vector that each list probabilities of a plurality of available classes, and wherein a version of the head and tail class probability vectors form the class-related data, and wherein the class-related data is a class of highest probability of the head probability vector and a class of highest probability of the tail probability vector.

By an example thirteenth implementation, at least one non-transitory computer-readable medium having stored thereon instructions that when executed cause a computing device to operate by: obtaining image head class input data and image tail class input data differentiated from the head class input data and respectively of two images each of a different object to be classified; respectively inputting the head and tail class input data into two separate parallel representation neural networks being trained to respectively generate head and tail features, wherein the representation neural networks share at least some representation weights used to form the head and tail features; inputting the head and tail features into at least one classifier neural network to generate class-related data; generating a class-balanced loss of at least one of the classes of the class-related data comprising factoring an effective number of samples of individual classes; and rebalancing an output sample distribution among the classes at the representation neural networks, classifier neural networks, or both by using the class-balanced loss.

By one or more fourteenth implementations, and further to the thirteenth implementation, wherein generating a class-balanced loss comprises factoring an inverse of the effective number of samples of a class.

By one or more fifteenth implementations, and further to the thirteenth or fourteenth implementation, wherein generating a class-balanced loss comprises determining a direct loss representing a difference in class index value between a predicted class of a version of one of the elements of the class-related data and a ground truth class.

By one or more sixteenth implementations, and further to the thirteenth or fourteenth implementation, wherein generating a class-balanced loss comprises determining a direct loss representing a difference in class index value between a predicted class of a version of one of the elements of the class-related data and a ground truth class, wherein the class-balanced loss function modifies the direct loss by factoring the inverse of the effective number of samples of a class.

By one or more seventeenth implementations, and further to any of the thirteenth to sixteenth implementation, wherein the class-balanced loss function modifies the direct loss by factoring the inverse of the effective number of samples of a class.

By one or more eighteenth implementations, and further to any of the thirteenth to seventeenth implementation, wherein the class-balanced loss is combination of modified direct losses computed once with a head ground truth of the head class input data and once with a tail ground truth of the tail class input data.

By one or more nineteenth implementations, and further to any of the thirteenth to seventeenth implementation, wherein the class-balanced loss is combination of modified direct losses computed once with a head ground truth of the head class input data and once with a tail ground truth of the tail class input data, and wherein the head and tail ground truths respectively are compared to a highest head probability and a highest tail probability of the classes represented in the class related data.

By one or more twentieth implementations, a computer-implemented system of object detection for image processing, comprises at least one memory; at least one processor communicatively coupled to the memory and being arranged to operate by: obtaining image head class input data and image tail class input data differentiated from the head class input data; respectively inputting the head and tail class input data into at least two separate parallel representation neural networks respectively being trained to generate head and tail features, wherein the representation neural networks share at least some representation weights used to form the head and tail features; inputting the head and tail features into at least one classifier neural network to generate class-related data; generating a class-balanced loss of individual classes comprising inputting a version of the class-related data in a class-balanced loss function that factors an effective number of samples of individual classes of the class-related data; and rebalancing an output sample distribution among the classes at the representation neural networks, classifier neural networks, or both by using the class-balanced loss.

By one or more twenty-first implementations, and further to the twentieth implementation, wherein the rebalancing comprises forming the class-balanced loss by combining modified direct head and tail losses to determine common weights of the representation neural network.

By one or more twenty-second implementations, and further to the twenty-first or twenty-second implementation, wherein the at least one processor is arranged to operate by training both the representation neural network and the classifier neural networks until the representation neural network has a class-balanced loss deemed sufficiently low; and thereafter continuing to train the classifier neural networks while using fixed weights at the representation neural networks.

By one or more twenty-third implementations, and further to any of the twenty-first to twenty-third implementation, wherein the at least one processor is arranged to operate by generating an imaging hash value comprising using the class-related data.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method, comprising:
   obtaining image head class input data and image tail class input data differentiated from the head class input data and respectively of two images each of an object to be classified;
   respectively inputting the head and tail class input data into two separate parallel representation neural networks being trained to respectively generate head and tail features, wherein the representation neural networks share at least some representation weights used to form the head and tail features;
   inputting the head and tail features into at least one classifier neural network to generate class-related data;
   generating a class-balanced loss of at least one of the classes of the class-related data comprising factoring an effective number of samples of individual classes; and
   rebalancing an output sample distribution among the classes at the representation neural networks, classifier neural networks, or both by using the class-balanced loss.

2. The method of claim 1 comprising determining whether individual samples forming the input data are head class samples or tail class samples before providing the samples as input to the representation learning neural networks.

3. The method of claim 2 wherein the determining comprises obtaining the ground truth of a class of a sample; and comparing a class number of the sample to a class threshold.

4. The method of claim 1 wherein generating the class-balanced loss comprises using a loss function that combines the losses of a head class image and a tail class image.

5. The method of claim 1 comprising receiving corresponding head and tail features output from the representation neural networks; and at least inversely modifying the corresponding head and tail features relative to each other.

6. The method of claim 5 wherein an adaptor factor changes to increase the value of tail features more as a number of features output from the representation neural networks increases.

7. The method of claim 1 comprising receiving a version of corresponding head and tail features and received respectively at two classifiers to generate a head class probability vector and a tail class probability vector that each list probabilities of a plurality of available classes, wherein a version of the head and tail class probability vectors form the class-related data, and wherein the class-related data is a class of highest probability of the head probability vector and a class of highest probability of the tail probability vector.

8. At least one non-transitory computer-readable medium having stored thereon instructions that when executed cause a computing device to operate by:
   obtaining image head class input data and image tail class input data differentiated from the head class input data and respectively of two images each of a different object to be classified;
   respectively inputting the head and tail class input data into two separate parallel representation neural networks being trained to respectively generate head and tail features, wherein the representation neural networks share at least some representation weights used to form the head and tail features;
   inputting the head and tail features into at least one classifier neural network to generate class-related data;
   generating a class-balanced loss of at least one of the classes of the class-related data comprising factoring an effective number of samples of individual classes; and
   rebalancing an output sample distribution among the classes at the representation neural networks, classifier neural networks, or both by using the class-balanced loss.

9. The medium of claim 8 wherein generating a class-balanced loss comprises factoring an inverse of the effective number of samples of a class.

10. The medium of claim 8 wherein generating a class-balanced loss comprises determining a direct loss representing a difference in class index value between a predicted class of a version of one of the elements of the class-related data and a ground truth class.

11. The medium of claim 10 wherein the class-balanced loss function modifies the direct loss by factoring the inverse of the effective number of samples of a class.

12. The medium of claim 8 wherein the class related data is a probability vector formed by cumulating a head class probability vector and a tail class probability vector output by the classifiers.

13. The medium of claim 8 wherein the class-balanced loss is combination of modified direct losses computed once with a head ground truth of the head class input data and once with a tail ground truth of the tail class input data.

14. The medium of claim 13 wherein the head and tail ground truths respectively are compared to a highest head probability and a highest tail probability of the classes represented in the class related data.

15. A computer-implemented system of object detection for image processing, comprising:
   at least one memory;
   at least one processor communicatively coupled to the memory and being arranged to operate by:
      obtaining image head class input data and image tail class input data differentiated from the head class input data;
      respectively inputting the head and tail class input data into at least two separate parallel representation neural networks respectively being trained to generate head and tail features, wherein the representation neural networks share at least some representation weights used to form the head and tail features;
      inputting the head and tail features into at least one classifier neural network to generate class-related data;
      generating a class-balanced loss of individual classes comprising inputting a version of the class-related data in a class-balanced loss function that factors an effective number of samples of individual classes of the class-related data; and rebalancing an output sample distribution among the classes at the representation neural networks, classifier neural networks, or both by using the class-balanced loss.

16. The system of claim 15 wherein the rebalancing comprises forming the class-balanced loss by combining modified direct head and tail losses to determine common weights of the representation neural network.

17. The system of claim 15 wherein the at least one processor is arranged to operate by training both the representation neural network and the classifier neural networks until the representation neural network has a class-balanced loss deemed sufficiently low; and thereafter continuing to train the classifier neural networks while using fixed weights at the representation neural networks.

18. The system of claim 15 wherein the at least one processor is arranged to operate by generating an imaging hash value comprising using the class-related data.

19. The system of claim 15 wherein all of the weights are shared when the representation neural networks have the same structure.

20. The system of claim 15 wherein all of the weights are shared except fully connected layers or softmax layers.

* * * * *